United States Patent [19]

Mizin et al.

[11] Patent Number: 4,557,758

[45] Date of Patent: Dec. 10, 1985

[54] STEELMAKING PROCESS

[76] Inventors: Vladimir G. Mizin, ulitsa Anosova, 6.; Alexei G. Zubarev, ulitsa Pervomaiskaya, 11/133, kv. 50.; Gennady S. Kolganov, ulitsa Kalinina, 26, korpus 2, kv. 307.; Stanislav S. Volkov, ulitsa Volodarskogo, 78, kv. 116.; Jury A. Rudnev, ulitsa Michurina, 130, kv. 112.; Evgeny N. Ivashina, ulitsa Vilyamsa, 2, korpus 2, kv. 341., all of Tula; Konstantin A. Blinov, ulitsa Kosinskaya, 18, korpus 3, kv. 103.; Petr I. Jugov, Malaya Polyanka, 10, kv. 18., both of Moscow, all of U.S.S.R.

[21] Appl. No.: 638,481

[22] PCT Filed: Jun. 2, 1983

[86] PCT No.: PCT/SU83/00018

§ 371 Date: Jul. 19, 1984

§ 102(e) Date: Jul. 19, 1984

[87] PCT Pub. No.: WO84/02353

PCT Pub. Date: Jun. 21, 1984

[30] Foreign Application Priority Data

Dec. 16, 1982 [SU] U.S.S.R. .............. 3518628

[51] Int. Cl.$^4$ .............................................. C21C 7/00
[52] U.S. Cl. ........................................ 75/51.2; 75/51.5
[58] Field of Search ........................ 75/51, 52, 60

[56] References Cited

U.S. PATENT DOCUMENTS 4,178,173 12/1979 Gorges ..................... 75/52
4,198,230 4/1980 Brotzmann ............... 75/60
4,334,921 6/1982 Hirai ....................... 75/52

Primary Examiner—Peter D. Rosenberg
Attorney, Agent, or Firm—Burgess, Ryan & Wayne

[57] ABSTRACT

A process of making steel from solid metal iron-bearing materials, especially metal scrap, in an oxygen converter comprises heating and melting the charge by supplying a fuel and an oxidizing agent in the direction from the bottom upwardly and from the side through the thickness of the materials charged into the converter, as well as top feeding of the oxidizing agent, whereupon the melt is refined while a silicon-containing heat carrier is added thereinto. At the same time, the side and top blowing of oxygen is discontinued while the bottom blowing thereof is reduced.

6 Claims, 1 Drawing Figure

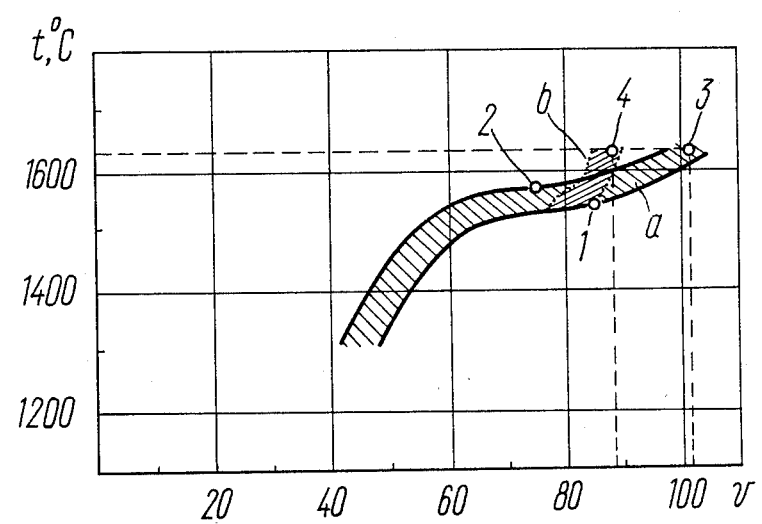

STEELMAKING PROCESS

FIELD OF THE INVENTION

The present invention relates to metallurgy and more in particular to a steelmaking process.

BACKGROUND ART

This invention is applicable to the manufacture of steel from solid iron-bearing charge materials in an oxygen steel-making converter. The iron-bearing charge material may include scrap (metal scrap, rolling crop shear, metal waste from the steelmaking industry, etc.) metallized pellets, sponge iron.

There is known a process of making steel in a converter with the use of a metal charge.

According to this process, the converter is to be equipped with bottom and side tuyeres in the form of a pipe-inside-pipe construction in which the central duct is used for the supply of oxygen and the external one for the delivery of a liquid or gaseous hydrocarbon. The process is carried out as follows.

First, the converter is charged with scrap, sponge iron, solid pig iron and the solid iron-bearing materials. The solid charge is preheated to a temperature of 1000°–1200° C. due to complete burning of a liquid or gaseous hydrocarbonaceous material in an oxidizing gas in accordance with the following reactions:

$$CH_4 + 2O_2 \rightleftharpoons CO_2 + H_2O \tag{1}$$

$$CH_4 + \tfrac{1}{2}O_2 \rightleftharpoons CO + 2H_2 + 8530 \text{ ccal/kg} \tag{2}$$

$$CO + \tfrac{1}{2}O_2 \rightleftharpoons CO_2 + 67780 \text{ ccal/kg} \cdot \text{mol} \tag{3}$$

$$2H_2 + O_2 \rightleftharpoons 2H_2O + 115600 \text{ ccal} \tag{4}$$

The following reactions proceed in the oxidizing atmosphere:

$$FeO + \tfrac{1}{2}O_2 \rightleftharpoons + 65120 \text{ ccal/kg} \cdot \text{mol} \tag{5}$$

$$Fe + CO_2 \rightleftharpoons FeO + CO - 2380 \text{ ccal/kg} \cdot \text{mol} \tag{6}$$

$$Fe + H_2O \rightleftharpoons FeO + H_2 + 7870 \text{ ccal/kg} \cdot \text{mol} \tag{7}$$

The products of combustion are mainly $CO_2$ and $H_2O$, as well as iron oxide.

Once molten metal is formed in the region of tuyeres, powdered hydrocarbonaceous materials (such as coke and coal) are fed into the converter to permit carbonization of the melt formed in the course of heating. As this happens, the consumption of the hydrocarbonaceous material is gradually reduced to a level at which the tuyeres are protected from damage, that is, down to 10–12% of the oxygen consumption. The entire metal charge is melted down toward the end of this period.

Next, the melt is refined in accordance with common practice such as performed during blowing of molten pig iron. The heating of the bath is effected by means of the heat resultant from the last-mentioned reaction, with CO prevailing in the flue gases. At the same time, powdered lime is introduced into the bath together with oxygen to form a slag bath.

On reaching a required temperature, the heat is poured into a ladle in which the metal undergoes deoxidation and alloying, and, if necessary, is subjected to further treatment.

The method described above is disadvantageous in that it requires blowing of powdered hydrocarbonaceous materials into the converter, the preparation and transportation of which necessitate installation of auxiliary equipment (mills, pipes for feeding coal-dust fuel) and, consequently, extra capital costs. Another deficiency of the above method is a substantial waste of iron due to its oxidation at the stage of preheating the scrap charged into the converter. The iron oxides make up the base of the first slag, which subsequently interact with the hydrocarbon of the powdered coke or coal injected into the bath, according to the reaction of direct reduction:

$$(FeO) + C = [Fe] + \{CO\} - 38,400 \text{ ccal/kg.mol} \tag{8}$$

which requires enormous consumption of heat. This reaction proceeds to increase the time period required for feeding powdered hydrocarbonaceous materials due to lack of heat needed to ensure complete melting-down of the metal scrap. At the same time iron oxide continue to get into the slag since oxidation of iron takes place mainly during oxygen blowing.

The above disadvantages are partly obviated by using lump hydrocarbonaceous fuel (coke or coal). The solid fuel charged with metal scrap ensures, along with the heat released according to the reactions (1)– (4), the heating of the charge due to the heat resultant from the following reaction:

$$C + \{O_2\} = CO_2 = 94,200 \text{ ccal/kg.mol} \tag{9}$$

In addition, the presence of solid hydrocarbonaceous fuel in contact with the metal scrap promotes its quicker melting due to decreasing melting temperature of the charge because of its carbonization. Nevertheless, it has been observed that the time period of the stage at which the charge is completely melted in the course of direct reducing reaction (8) is likewise prolonged even though the heats are operated on a solid fuel. This is established by the fact that on consuming from 40–50 to 70–80 m³ of oxygen per ton of charge and bringing the temperature up to 1520°–1570° C., the temperature then rises slower than in the previous period. Simultaneously, the slag oxidation rate increases with the amount of iron oxides getting thereinto. This, in turn, results in higher losses of iron due to oxidation, and in a higher flow rate of oxygen. Therefore, to improve thermal balance of the heat, additional heat carriers, such as silicon, aluminum and others should be used to prevent the reaction of direct reduction (8) and, consequently, undesirable losses of heat.

There is known still another steel making process which is operated on solid iron-bearing materials and which makes use of an oxygen converter with combined blowing, wherein oxygen and a powdered hydrocarbonaceous material are concurrently introduced into the bath below the metal level. The amount of steel thus produced exceeds by 10 to 30% the nominal weight of the heat accommodated in a steel-teeming ladle. On tapping the heat and filling the ladle, this additional amount of metal (10–30% of the heat weight) is left in the converter so as to undergo carbonization and then to be alloyed with silicon, for distance, during subsequent tapping of "the additional" metal into an auxiliary ladle, with the amount of silicon to be introduced being calculated in view of obtaining metal with the silicon content of up to 1.5%. The silicon-containing metal is poured from the auxiliary ladle into the converter onto the preheated solid charge to start a new heat. In this way it becomes possible to improve thermal balance of the heat thereby partly eliminating the disadvantages inherent in the above-described process.

However, the last-mentioned steelmaking process is likewise disadvantages in that it requires the use of an auxiliary ladle, which brings down productivity of labour in the shop and increases the consumption of refractories. Furthermore, the operation schedule in the shop is complicated with the introduction of a new process stage, transportation of the auxiliary ladle to the charging bay of the shop where the residual metal is poured into the converter, to say nothing of other additional operations required therefor.

SUMMARY OF THE INVENTION

What is desired is a steelmaking process to be operated on a solid metal iron-bearing material and permitting the production of steel to be effected directly in an oxygen converter without utilizing auxiliary process equipment and allowing the amount of refractory materials and the consumption of an oxidizing agent to be reduced along with enhanced production rate of the converter.

Thus the invention provides a steelmaking process operated on a solid metal iron-bearing charge material especially metal scrap, in an oxygen converter, which comprises heating and melting the solid metal iron-bearing charge material by supplying a fuel and an oxidizing agent in the direction from the bottom upwardly and from the side through the thickness of the materials charged into the converter, and feeding the oxidizing agent from the top onto the charged materials, whereupon the resultant melt is refined while carbon- and silicon-containing heat carriers are added in the course of making steel, according to the invention, the silicon-containing heat carrier is added into the melt during its refining as the side- and top-feeding of the oxidizing agent is concurrently discontinued while the bottom-feeding thereof is reduced.

The silicon-containing heat carrier is preferably added after the oxidizing agent has been consumed in an amount corresponding to 75-85 m³ of oxygen per ton of the solid metal iron-bearing charge material.

The bottom feeding of the oxidizing agent is preferably brought down to an amount corresponding approximately to 1-2 m³ of oxygen per minute per ton of the solid metal iron-bearing charge material.

The silicon-containing heat carrier is preferably added in an amount permitting 3 to 10 kg of silicon to be introduced per ton of the solid metal iron-bearing charge material.

As the silicon-containing heat carrier, in addition to standard ferrosilicon, use is preferably made of the rejects from any ore-roasting plant or of the ferrosilicon separated from the ash-slag waste of a coal-fired steam plant.

BRIEF DESCRIPTION OF THE ACCOMPANYING DRAWING

The invention will now be described, by way of example only, with reference to the accompanying drawing, which is a chart representing the metal temperature change in a converter as a function of the oxygen flow rate per ton of metal charge.

BEST MODE OF CARRYING OUT THE INVENTION

The steelmaking process is carried out in the following sequence of operations.

An iron-bearing charge material, such as metal scrap, and a solid hydrocarbonaceous fuel, such as bituminous coal, are fed into a converter in an amount of approximately 50.0 to 80.0 kg per ton of metal charge. Next, fuel and an oxidizing agent are delivered through bottom and side tuyeres in the direction from the bottom upward and from the side through the thickness of the materials charged into the converter. In addition, an oxidizing agent is supplied through a top tuyere. The bath of the converter is heated, in an average, to 1100°-1300° C. after using about 40 to 50 m³ of oxygen per ton of the metal charge. Then, the charge starts melting.

Initially, molten metal is formed in the zones of action of the side tuyeres. It is exactly at this moment that a first ferriferrous slag begins to form. Next, the olid hydrocarbon of the coal fines interacts with the first ferriferrous slag to give rise to the reaction of direct reduction of iron (8), which requires an appreciable consumption of heat. With the presence of unmelted scrap in the bath, the reaction of direct reduction of iron proceeding, a further rise of the bath temperature is slowed down, as can be seen from the chart representing the change of metal temperature "t" in the converter as a function of the oxygen flow rate "v" per ton of metal charge. This is indicated by a segment corresponding to a temperature of 1520°-1570° C. The temperature "t" of metal is maintained at this level for a long period of time, with any noticeable rise in the temperature "t" taking place in the bath only after the whole of the charge is melted down. According to the chart, the moment of complete melting of the charge determined by the inflection of the curve corresponds to "v" representing the oxygen flow rate in the range of about $v=75-85$ $m^3/t$. Afterward, during further oxidizing blowing, the rise in temperature is stepped up (see the region "a" in the curve). However, to attain a required temperature in the bath (1600°-1650° C.), an additional amount of oxygen, about 20 m³, will have to be supplied. In other words, the oxygen blowing operation will take another 7-8 min.

Depending on thermal properties of the scrap treated in the converter, its melting will proceed at a slower or faster rate. Where heavy-weight scrap is used, the rise in temperature is indicated by the lower curve. According to the chart, the moment of complete melting corresponding to the oxygen flow rate $v=85$ $m^3/t$ (point 1). Light-weight scrap requires less power input for its melting and, consequently, a smaller amount of oxygen. As can be seen from the chart, about 75 m³/min of oxygen is required in the given case (point 2).

To enhance the production rate, the moment of introducing additional silicon-containing heat carriers should be shifted in time, so that these heat carriers were introduced into the converter at the moment following complete melting-down of the metal scrap, i.e. at the moment which corresponds to the region between points 1 and 2. Positive effect from such addition of the silicon-containing heat carriers is substantiated by the following reaction:

$$2(FeO)+Si=2Fe+(SiO_2)+79,500 \text{ ccal/mol}, \qquad (10)$$

which is followed by far greater exothermal effect, as compared to the total exothermal effect of the {CO} formation in accordance with the reaction (8) of direct reduction and its final burning. Owing to exothermal effect (the reaction 10), the heating of metal is considerably reduced, and the consumption of oxygen is brought down, as is seen from the chart. The addition of the silicon-containing heat carrier at the time of blowing, corresponding to the oxygen flow rate of $v=75-85 m^3/t$ between points 1 and 2), will be indicated in the chart by a rise in the bath temperature. This dependence is characterized by that horizontal segment of the curve is shortened, with the moment of attaining a prescribed temperature corresponding, for example, not to point 3 in the region "a", but to point 4 in the region "b". As the demand in oxygen supply is reduced, so is the time of blowing. In other words, the production rate is increased. Furthermore, as no additional ladle is required, an appreciable economy in refractory materials is gained. Although it would be preferable to perform charging of additional heat carriers before reaching points 1 and 2, this is undesirable by reason of the fact that the presence of non-melted metal in the bath will increase consumption of heat carriers, resulting in a marked decrease in the basicity of slag. Adding of the heat carriers after utilizing more than about 83 $m^3$ of oxygen per ton of charge would cause overheating of metal. In practice, the moment of adding auxiliary silicon-containing heat carriers is selected so as to guarantee passage of the horizontal segment of the curve, that is, with $v=80-85 m^3/t$.

It has been experimentally found that from 3 to 10 kg of silicon, for example, ferrosilicon, should be introduced per ton of metal charge. It is impossible to take into account, by way of calculation, such factors as the presence of solid particles of coal in the molten slag. These coal particles remain in the slag bath until the end of the heat. It is likewise impossible to determine the intensity of the reaction (8) or, for that matter, to take it into account during calculation. According to the obtained data, with the addition of silicon in an amount of less than 3 kg per ton of metal charge, the action of the auxiliary heat carrier is insufficient, since the rise in temperature indicated at the chart does not extend beyond the limit of points. With the consumption of silicon exceeding 10 kg/t, the basicity of slag is markedly reduced. This, needless to say, is quite undesirable. Taking into account the afore-cited factors, the best results are gained with the consumption of auxiliary heat carriers, as calculated for silicon, being 5 to 8 kg/t.

To reduce the amount of ferric oxide passing into the slag after adding silicon-containing heat carriers, the supply of oxygen through the side and top tuyeres is discontinued, with the flow rate of oxygen admitted through the bottom tuyeres being reduced to a level where the overflowing of tuyeres with metal is ruled out. In other words, the flow rate of oxygen is brought down to be $1-2 m^3$ per ton of metal charge per min.

Rejects of ore-roasting plants, for example, the slag resultant from the production of ferrosilicon and containing, in addition to oxides, CaO, MgO, $Al_2O_3$, metal inclusions (ferrosilicon) and silicon carbide, may be used as the silicon-containing heat carrier. The contents of these components vary in the range of 18-25% Si, 15-25% Fe, 5-15% Sic. The waste of the electrothermal production of aluminum-silicon, such as dross, may well be used as the heat carrier. This type of waste contains 30-40% aluminum-silicon, 10-12% silicon carbide, the oxide fraction being represented mainly by alumina, fluorides, calcium oxides. With regard to other rejects of the core-roasting plants, use can also be made of granular slag ferrosilicon separated from the ash-slag waste or powerful hydroelectric stations, containing not less than 14% Si, not more than 1.5% C, 0.4% S, 1.0% P. In separate cases, the content of silicon may be as high as 40-60%. An increased content of sulphur and phosphorus in the above mentioned waste does not forbid their use in the converter process in view of relatively small consumption of converter slags, as well as their good dephosphorizing and desulphurizing capacity.

Where the converter steelmaking process is operated on an all-solid charge made up of 100% metal scrap, special heat carriers, such as iron-silicon-aluminum alloys are preferably smelted for the purpose.

The invention will be further described by the following illustrative Examples.

EXAMPLE 1

The charge used for making steel in a 10-ton combined-blown converter was composed of 9.8 t scrap, 0.5 t lime, and 0.6 t bituminous coal. The heating of scrap and its melting took 29 min 30 sec, with the consumption of oxygen amounting to 739 $m^3$ or 75.4 $m^3$ per ton of metal charge. For the same time, oxygen and natural gas were delivered through the side and bottom tuyeres at a flow rate of 20-30 $m^3$/min and 5-15 $m^3$/min, respectively. The temperature of melt afterward was 1565° C. Then the supply of oxygen and natural gas through the side tuyeres was discontinued and through the bottom tuyeres it was reduced: oxygen was fed at a rate of 13.5 $m^3$/min (1.4 $m^3$/t.min) and natural gas at a rate of 1.5 $m^3$/min. Then, 75-% ferrosilicon was fed into the converter in an amount of 80 kg or, as calculated for silicon, 6.1 kg per ton of metal charge. The blowing of oxygen through the bottom tuyeres was discontinued after 2 min. 20 sec following the addition of ferrosilicon. On completion of blowing, the metal contained 0.05% C, 0.04% Mn, 0.022% S, 0.008% P. The slag contained 20.5% FeO, 33.0% CaO, 20.8% $SiO_2$, other components being the balance.

EXAMPLE 2

Metal scrap, lime and hard coal in amounts of 9.5 t, 0.550 t and 0.480 t, respectively, were charged into the converter. Then, oxygen was supplied through the bottom and side tuyeres in an amount of 783 $m^3$ or at a flow rate of 82.4 $m^3$/t for a period of 28 min. 30 sec, whereafter the melt temperature was 1560° C. This being done, the supply of oxygen and natural gas through the side tuyeres was discontinued, and through the bottom tuyers it was reduced to be 13.5 $m^3$/min and 1.4 $m^3$/min, respectively. Thereafter, 65 kg of 75-% ferrosilicon (5.0 kg of silicon per ton of metal charge) and 20 kg of electrode scrap was charged into the converter. The blowing of oxygen (fed at a reduced rate of 1.4 $m^3$/t.min) was discontinued after 1 min. 40 sec. The metal, containing after refining 0–0.04% C, 0.03% Mn, 0.026% S, 0.007% P, had a temperature of 1600° C. The slag contained 16.4% FeO, 35.3% CaO and 22.7% $SiO_2$, other components being the balance. The weight of molten metal in the ladle was 8.8 t.

EXAMPLE 3

The charge piled into the converter was made up of 10.1 t of metal, 0.650 t of lime and 0.550 t of hard coal.

The heating and melting of charge required 856 m³ of oxygen, which was blown at a rate of 84.7 m³/t. Then, 130 kg of 75-% ferrosilicon (9.6 kg of silicon per ton of metal charge) and 30 kg of electrode scrap was charged into the converter. The supply of oxygen and natural gas through the side tuyeres was then discontinued, while the flow rate of oxygen through the bottom tuyeres was reduced to 15 m³/min (1.5 m³/t.min). Natural gas was fed through the slit ducts of the tuyeres at a flow rate of 1.5 m³/min. The blowing was carried out for 1 min. 15 sec. At the end of the blowing period the metal, containing 0.04% C, 0.04% Mn, 0.028% S and 0.010% P, had a temperature of 1620° C. The weight of molten metal in the ladle was 9.5 t.

EXAMPLE 4

A steelmaking process was operated on a 100-% metal scrap (9.6 t of scrap, 0.500 t of lime and 0.580 t of hard coal fines was charged into the converter). The heating and melting of metal was performed with the use of oxygen blown at a rate of 83.9 m³/t (805 m³ of oxygen was consumed during 30 min. 30 sec). About 100 kg of ferrosilicon slag was added into the melt. The slag waste contained 14.7% CaO, 18.8% $SiO_2$, 10.9% $Al_2O_3$, 45.8% metal inclusions and 8.2% silicon carbide. The content of silicon in the metal inclusions was about 63%. Thus, 3.6 kg of silicon was used per ton of metal charge. Upon adding the slag rejects of the ferrosilicon production, the blowing was carried out with the flow rate of oxygen being 13.5 m³/min (1.4 m³/t.min) and that of natural gas 1.5 m³/min. The blowing operation was discontinued after 1 min 40 sec. The temperature of metal at the moment was 1615° C. The slag contained 24.1% FeO. The weight of molten metal was 8.9 t.

EXAMPLE 5

A steelmaking process was operated on a 100-% metal scrap (9.7 t of metal scrap, 0.450 t lime and 0.620 t hard coal fines charged into the converter). The heating and melting was performed with the use of oxygen blown at a rate of 83.9 m³/t (824 m³ of oxygen was consumed) for 30 min. The silicon-containing heat carrier used was the dross of the aluminum production, containing 34.7% aluminium-silicon, 12.1% silicon carbide and 41.8% aluminum oxide. Then, 110 g of dross was added into the melt, which corresponded to the consumption of heat carrier in an amount of 4 kg/t as calculated for silicon. After adding dross, the supply of oxygen and natural gas through the side tuyeres was discontinued, and the flow rate of oxygen was reduced to 13.5 m³/min (with natural gas being fed along the slit ducts at a rate of 1.7 m³/min). The blowing operation was continued for 1 min 30 sec, whereafter the converter was turned down. The temperature rature of metal (0.06% C) was 1610° C., the content of $FeO_2$ in the slag amounted to 20.2%. The weight of molten metal in the ladle was 9.2 t.

The process data according to the illustrative Examples 1–5 are given in the Table below. Average characteristics of the heats to which the process technique was not applied are also given in the Table. Technical and economic advantages of the steelmaking process according to the invention are obvious. Thus, the oxygen blowing time is reduced by 15 to 20%. The production rate of converters is increased by the same percentage. The flow rate of oxygen is lowered by 10–20 m³/t. Since the necessity of discharging "additional" metal into the ladle and its subsequent overflowing into the converter, as is the case in the prior-art process, the consumption of refractories is reduced by 5–7 kg per ton of steel. In addition, the amount of refractories directly used for lining is likely to be reduced.

TABLE

| No | Characteristics | Example 1 | Example 2 | Example 3 | Example 4 | Example 5 | Average data for heats performed without silicon-containing heat carriers |
|---|---|---|---|---|---|---|---|
| 1 | 2 | 3 | 4 | 5 | 6 | 7 | 8 |
| 1 | Charged: metal scrap, t | 9.8 | 9.5 | 10.1 | 9.6 | 9.7 | 9.7 |
| 2 | hard coal fines, t | 0.600 | 0.480 | 0.550 | 0.580 | 0.620 | 0.540 |
| 3 | lime, t | 0.500 | 0.550 | 0.650 | 0.500 | 0.450 | 0.500 |
| 4 | Heating and melting time (determined by the flow rate of oxygen 75-85 m³/t), min-sec | 29-30 | 28-30 | 27-50 | 30—30 | 30-00 | 29-00 |
| 5 | Consumption of oxygen during heating and melting, m³/t | 75.4 | 82.4 | 84.7 | 83.9 | 84.9 | 80.7 |
| 6 | Consumption of silicon-containing heat carrier during final refining silicon kg/t | 6.1 | 5.0 | 9.6 | 3.5 | 4.0 | — |
| 7 | Final refining time, min-sec | 2-20 | 1-40 | 1-15 | 1-40 | 1-30 | 8-00 |
| 8 | Metal temperature after final refining, °C. | 1630 | 1610 | 1620 | 1615 | 1610 | 1640 |
| 9 | Consumption of oxygen during final refining, m³/t | 3.2 | 2.4 | 1.9 | 2.3 | 2.1 | 20.6 |
| 10 | Consumption of oxygen per heat m³/t | 83.4 | 84.8 | 86.6 | 86.2 | 87.0 | 101.3 |
| 11 | Content of $FeO_2$ in final slag, % | 20.5 | 16.4 | 13.9 | 24.1 | 20.2 | 26.6 |
| 12 | Production of liquid steel, | 9.2 | 8.8 | 9.5 | 8.9 | 9.2 | 8.8 |
| 13 | Yield of liquid steel, | 93.9 | 92.6 | 94.0 | 92.7 | 94.8 | 90.7 |

TABLE-continued

| No | Characteristics | Example | | | | | Average data for heats performed without silicon-containing heat carriers |
| | | 1 | 2 | 3 | 4 | 5 | |
| 1 | 2 | 3 | 4 | 5 | 6 | 7 | 8 |
| 14 | % Blowing time, min-sec, | 31–50 | 30–10 | 29–05 | 32–10 | 31–30 | 37–00 |

What is claimed is:

1. In a process for making steel from solid metal iron-bearing charge materials in an iron converter, comprising heating and melting the solid metal iron-bearing charge material by supplying a fuel and an oxidizing agent from the bottom upwardly and from the side through a bed of the metal-bearing materials charged into the converter, feeding oxidizing agent from the top onto the charge materials to form a melt, and subjecting the melt to refining, while a carbon and a silicon containing heat carrier are added in the course of the steel making process, the improvement which comprises; charging the silicon containing heat carrier into the converter at a time corresponding to the time when the solid metal iron-bearing charge materials are completely converted from the solid to a molten state while, simultaneously stopping the supply of the oxidizing agent from the side and from the top, and reducing the supply of the oxidizing agent from the bottom.

2. A steelmaking process as claimed in claim 1, characterized in that the silicon-containing heat carrier is added after using the oxidizing agent in an amount corresponding to 75–85 $m^3$ of oxygen per ton of the charge.

3. A steelmaking process as claimed in claim 1 or 2, characterized in that the bottom feeding of the oxidizing agent is reduced to an amount corresponding to about 1–2 $m^3$ of oxygen per ton of the charge.

4. A steelmaking process as claimed in claim 1, 2 or 3, characterized in that the silicon-containing heat carrier is added in an amount permitting 3–10 kg of silicon to be introduced per ton of the charge.

5. A steelmaking process as claimed in claim 1, 2, 3 or 4, characterized in that rejects of an ore-roasting plant are used as silicon-containing heat carrier.

6. A steelmaking process as claimed in claim 1, 2, 3 or 4, characterized in that ferrosilicon recovered from the ash-slag wastes of coal-fired steam plants is used as the silicon-containing heat carrier.

* * * * *